United States Patent
Gretz

(10) Patent No.: US 8,921,712 B1
(45) Date of Patent: Dec. 30, 2014

(54) ELECTRICAL BOX ASSEMBLY FOR POURED CONCRETE FLOORS

(71) Applicant: Thomas J. Gretz, Port St. Lucie, FL (US)

(72) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 64 days.

(21) Appl. No.: 13/944,612

(22) Filed: Jul. 17, 2013

(51) Int. Cl.
 *H02G 3/04* (2006.01)
 *H02G 3/12* (2006.01)
(52) U.S. Cl.
 CPC . *H02G 3/04* (2013.01); *H02G 3/12* (2013.01); *Y10S 248/906* (2013.01)
 USPC .............. 174/487; 439/535; 248/906; 174/50
(58) Field of Classification Search
 USPC .................... 174/50, 487; 220/4.02; 439/535; 248/906
 See application file for complete search history.

(56) References Cited

U.S. PATENT DOCUMENTS

| | | | |
|---|---|---|---|
| 5,272,278 A | 12/1993 | Wuertz | |
| 5,466,886 A * | 11/1995 | Lengyel et al. | ............... 174/487 |
| 5,783,774 A | 7/1998 | Bowman et al. | |
| 6,179,634 B1 | 1/2001 | Hull et al. | |
| 7,795,544 B2 | 9/2010 | Peck | |
| 8,273,998 B2 | 9/2012 | Drane | |

* cited by examiner

*Primary Examiner* — Dhirubhai R Patel

(57) ABSTRACT

An electrical box assembly for concrete pours that includes an improved leveling ring and can be adapted to mount either high or low voltage components or a combination of high and low voltage components. The leveling ring for leveling an electrical component with respect to the concrete surface includes one or more legs extending outward of the ring's periphery for improving adhesion of the ring with the inner surface of the electrical box. The versatility of the electrical box is improved by a slide member that can be inserted within the enclosure of the electrical box in order to subdivide the enclosure into high and low voltage compartments. Leveling rings are provided in two embodiments for mounting conventional electrical box covers, one for mounting a flat electrical box cover and one for mounting a pop-up electrical box cover.

20 Claims, 13 Drawing Sheets

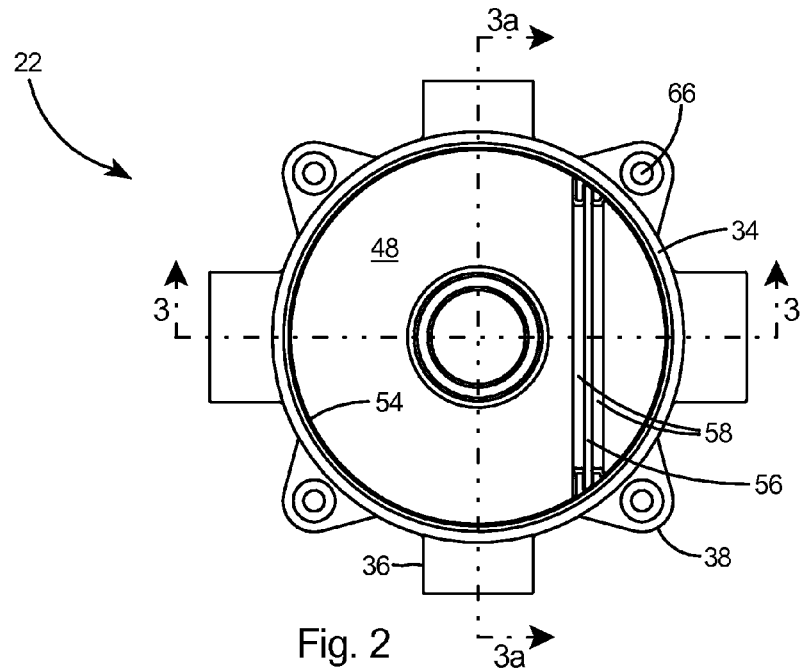
Fig. 2
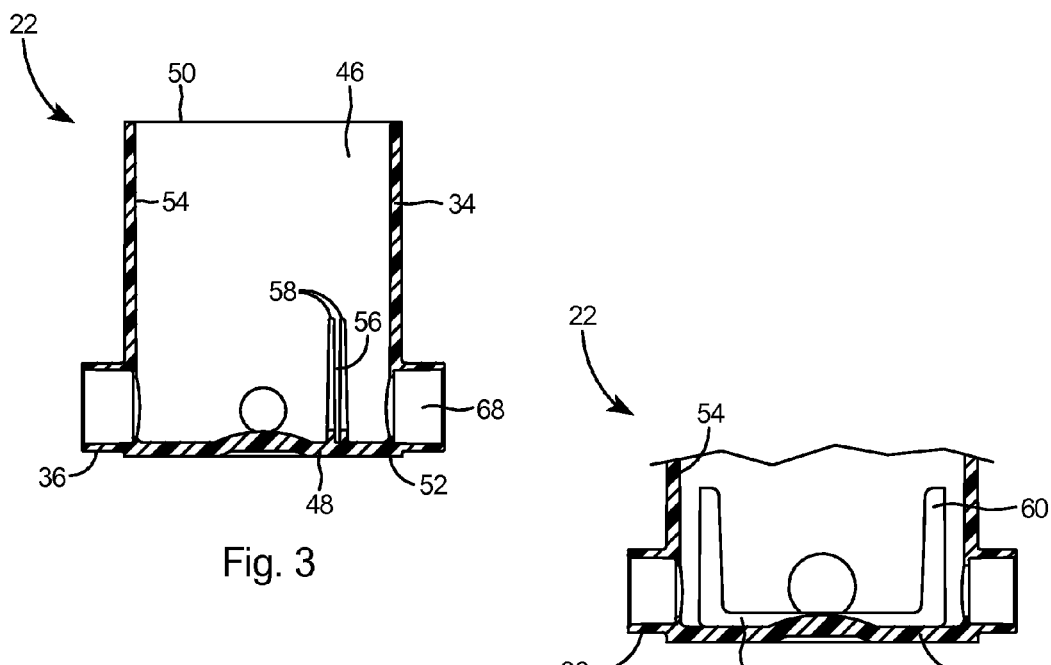
Fig. 3
Fig. 3a

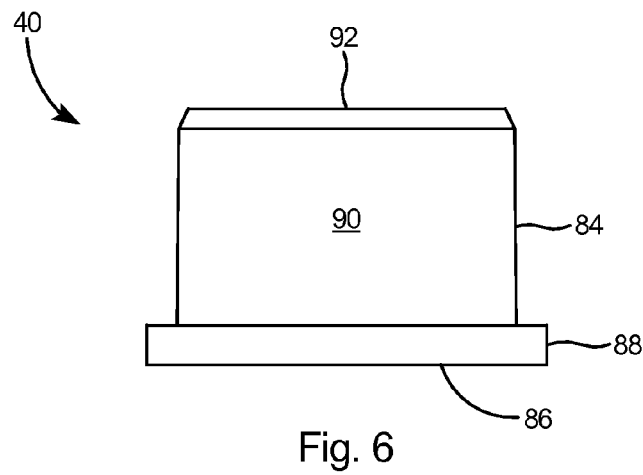
Fig. 6
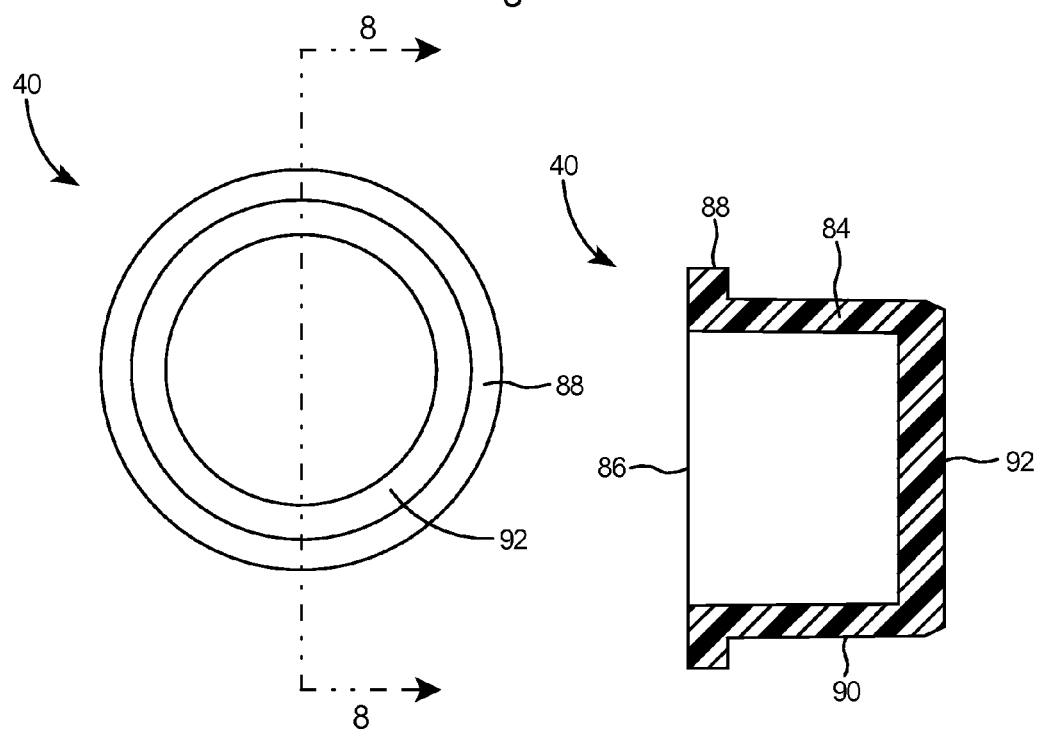
Fig. 7
Fig. 8

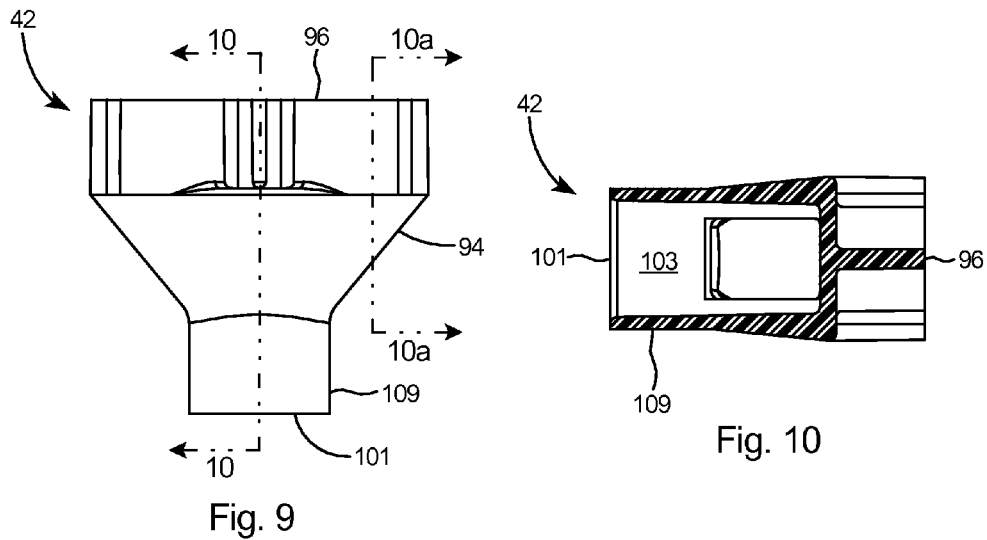
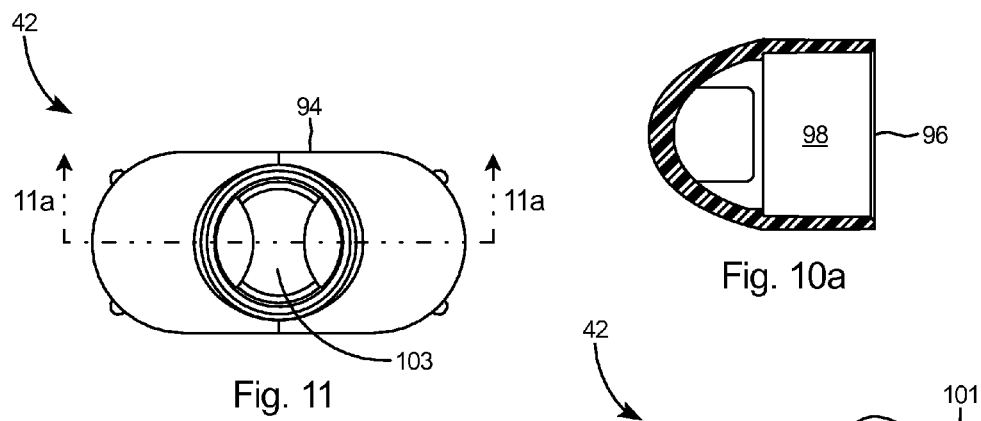
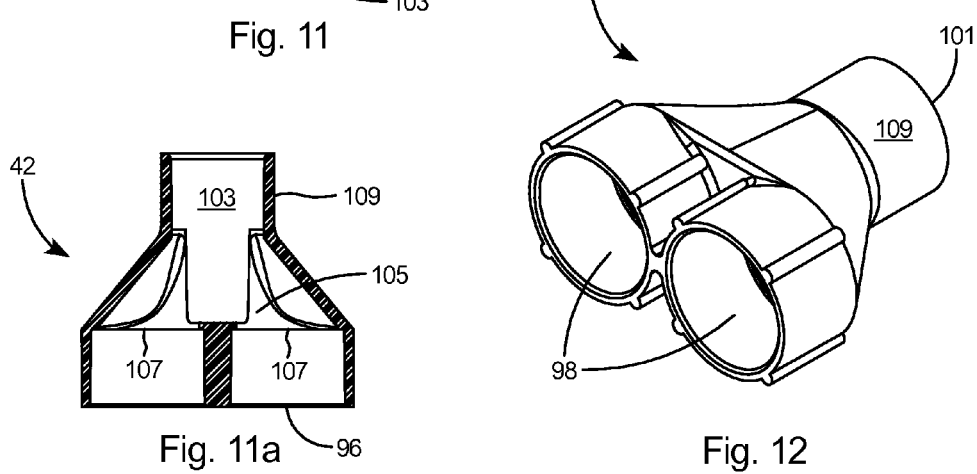

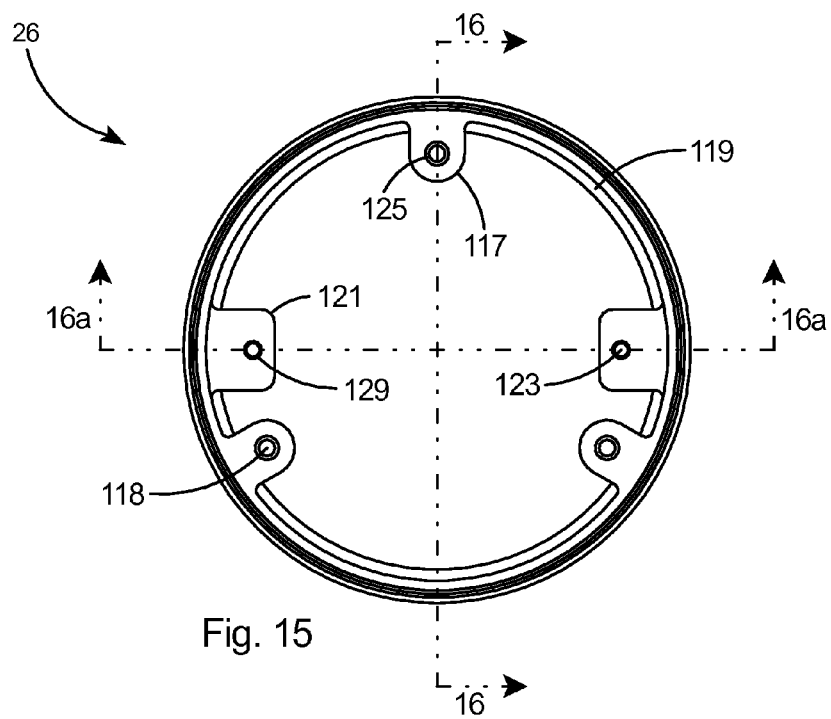
Fig. 15
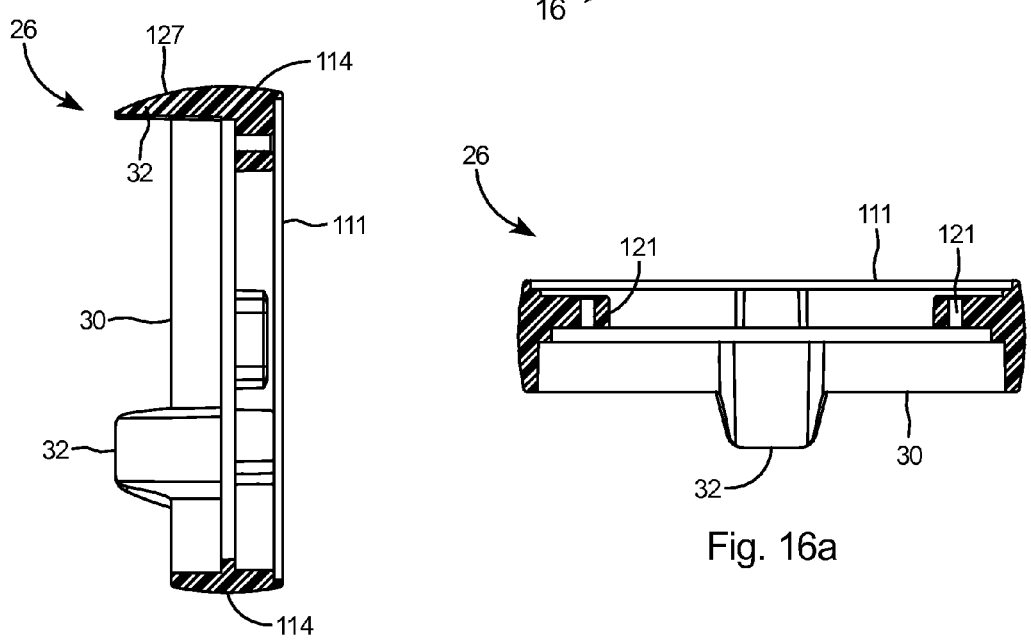
Fig. 16
Fig. 16a

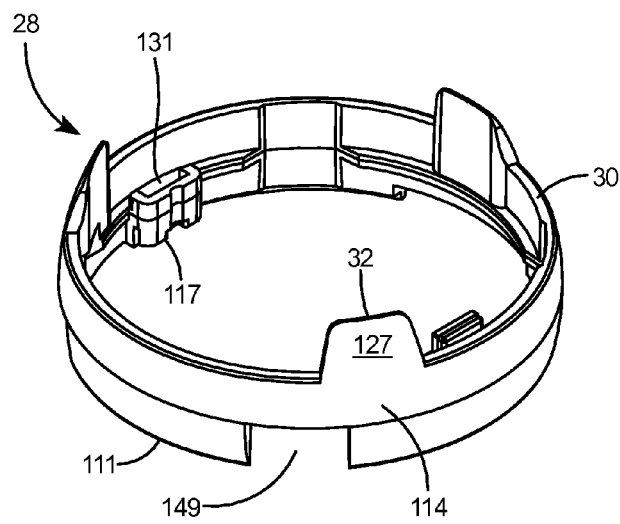
Fig. 17
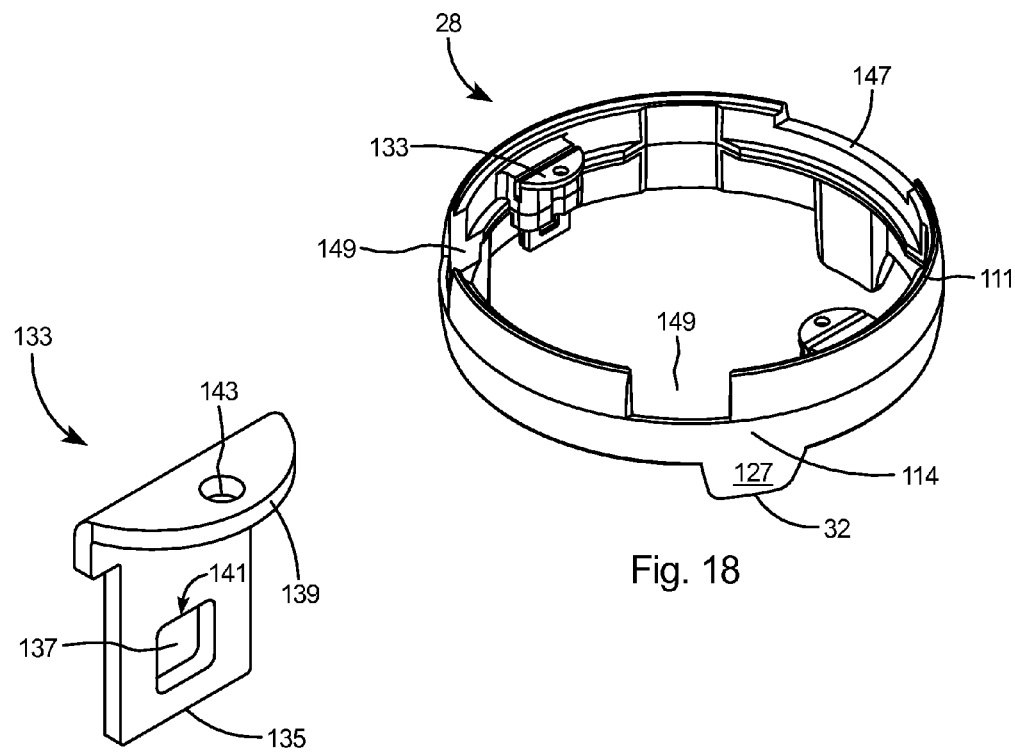
Fig. 18
Fig. 19

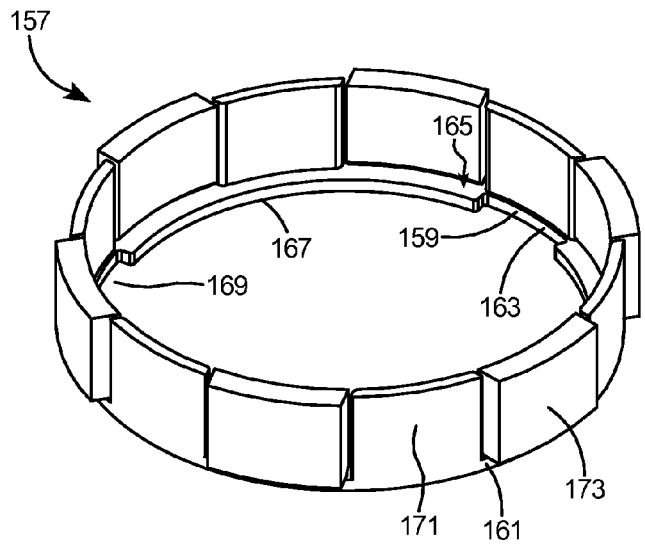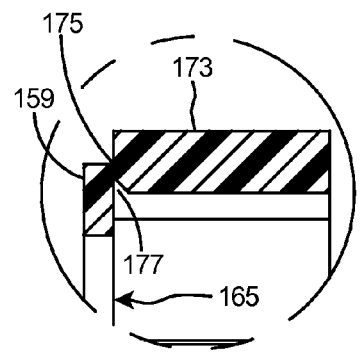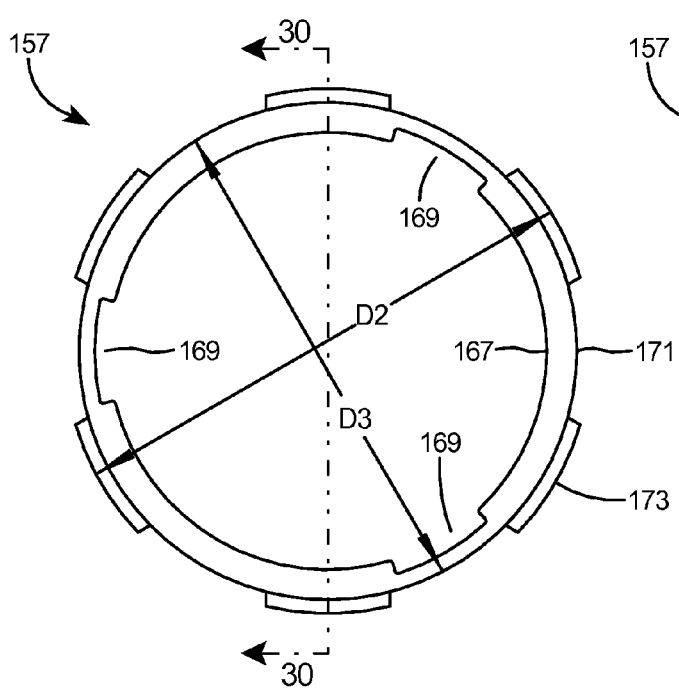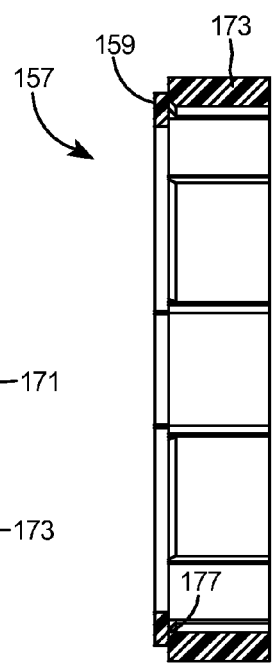
Fig. 28
Fig. 30a
Fig. 29
Fig. 30

ELECTRICAL BOX ASSEMBLY FOR POURED CONCRETE FLOORS

FIELD OF THE INVENTION

The present invention generally relates to electrical boxes, and specifically to an electrical box for mounting an electrical device in a poured concrete floor.

BACKGROUND OF THE INVENTION

A common desire in the pouring of concrete floors for basements, patios, and the like, is the installation of one or more electrical outlets in the concrete floor in order to provide electrical service in a given floor area. In order to meet this need, electrical boxes have been proposed for concrete pours. These boxes are placed within the forms that will receive the concrete pour and the concrete is poured around the electrical box, and, after the concrete cures, an electrical component is mounted within the box.

One problem that commonly occurs when an electrical box is placed within the form area that will receive the concrete pour is the shifting of the orientation of the electrical box as a result of the heavy concrete mixture forcing the box out of the desired plumb vertical orientation. In other cases, the concrete surface is purposely sloped and the concrete pour forces the electrical box out of alignment with the concrete surface. In either case, an adjustment must be made in order to mount the electrical component, such as a duplex receptacle, level with the concrete surface.

Several electrical boxes have been proposed in order to compensate for the misalignment of an electrical box as a result of a concrete pour. Typically, these electrical boxes use a leveling ring that can be adjusted to align the electrical component with the level of the concrete. Two types of leveling rings have been proposed, including those attached by clips within the electrical box and those secured to the box by adhesive. In order to be able to level in any desired direction, the outer surface of the adhesive attached leveling rings is arcuate in shape. Although electrical boxes with leveling rings secured by adhesive have been proposed, as a result of the arcuate outer surface of the ring, the amount of surface available for adhesive contact of the ring with the inner wall of the electrical box is minimal. This minimal contact between the leveling ring and the inner wall of the electrical box has been known to cause loosening of the ring from the electrical box inner wall and thus causes loosening of the electrical component mounted therein.

What is needed therefore is an improved electrical box for concrete pours that enables secure mounting of an electrical device therein and also enables mounting of both flat and pop-up electrical covers. Furthermore, what is needed is an electrical box for concrete pours that provides the capability to mount both high and low voltage components in the same box.

BRIEF SUMMARY OF THE INVENTION

The invention is an electrical box assembly for concrete pours that includes an improved leveling ring and which can be adapted to mount either high voltage components, low voltage components, or a combination of high and low voltage components. The leveling ring for leveling an electrical component with respect to the concrete surface includes one or more legs extending outward of the ring's periphery. The legs increase the amount of ring surface available for bonding with the inner surface of the electrical box, thereby enabling the ring to bond more securely to the electrical box. The versatility of the electrical box is improved by a slide member that can be inserted within the enclosure of the electrical box in order to subdivide the enclosure into high and low voltage compartments. Leveling rings are provided in two embodiments for mounting conventional electrical box covers, one for mounting a flat electrical box cover and one for mounting a pop-up electrical box cover. A leveling ring adapter is provided for adapting either embodiment of the leveling ring in an electrical box with a wider enclosure.

BRIEF DESCRIPTION OF THE SEVERAL VIEWS OF THE DRAWING(S)

Reference is made herein to the accompanying drawings, which are not necessarily drawn to scale, and wherein:

FIG. 2 is a top view of an electrical box that forms a portion of the electrical box assembly of FIG. 1.

FIG. 3 is a sectional view of the electrical box taken along line 3-3 of FIG. 2.

FIG. 3a is a sectional view of the bottom portion of the electrical box taken along line 3a-3a of FIG. 2.

FIG. 6 is a side view of a reducer that forms a portion of the electrical box assembly of FIG. 1.

FIG. 7 is a view of the reducer as taken from the top side of FIG. 6.

FIG. 8 is a sectional view of the reducer taken along line 8-8 of FIG. 7.

FIG. 9 is a top view of a Y-connector that forms a portion of the electrical box assembly of FIG. 1.

FIG. 10 is a sectional view of the Y-connector taken along line 10-10 of FIG. 9.

FIG. 10a is a sectional view of the Y-connector taken along line 10a-10a of FIG. 9.

FIG. 11 is an end view from of the Y-connector as viewed from the bottom of FIG. 9.

FIG. 11a is a sectional view of the Y-connector taken along line 11a-11a of FIG. 11.

FIG. 12 is a bottom perspective view of the Y-connector.

FIG. 15 is a plan view of the leveling ring for a flat cover.

FIG. 16 is a sectional view of the leveling ring for a flat cover taken along line 16-16 of FIG. 15.

FIG. 16a is a sectional view of the leveling ring for a flat cover taken along line 16a-16a of FIG. 15.

FIG. 17 is a bottom perspective view of a second embodiment of a leveling ring or leveling ring for a pop-up cover that forms a portion of the electrical box assembly of FIG. 1.

FIG. 18 is a top perspective view of the leveling ring for a pop-up cover.

FIG. 19 is a perspective view of a clip member that forms a portion of the leveling ring for a pop-up cover.

FIG. 28 is a perspective view of a leveling ring adapter according to the present invention.

FIG. 29 is a plan view of the leveling ring adapter of FIG. 28.

FIG. 30 is a sectional view of the leveling ring adapter taken along line 30-30 of FIG. 29.

FIG. 30a is a detailed view of a portion of the sectional view of FIG. 30 depicting the notched section of the leveling ring adapter.

DETAILED DESCRIPTION

Figure 1:
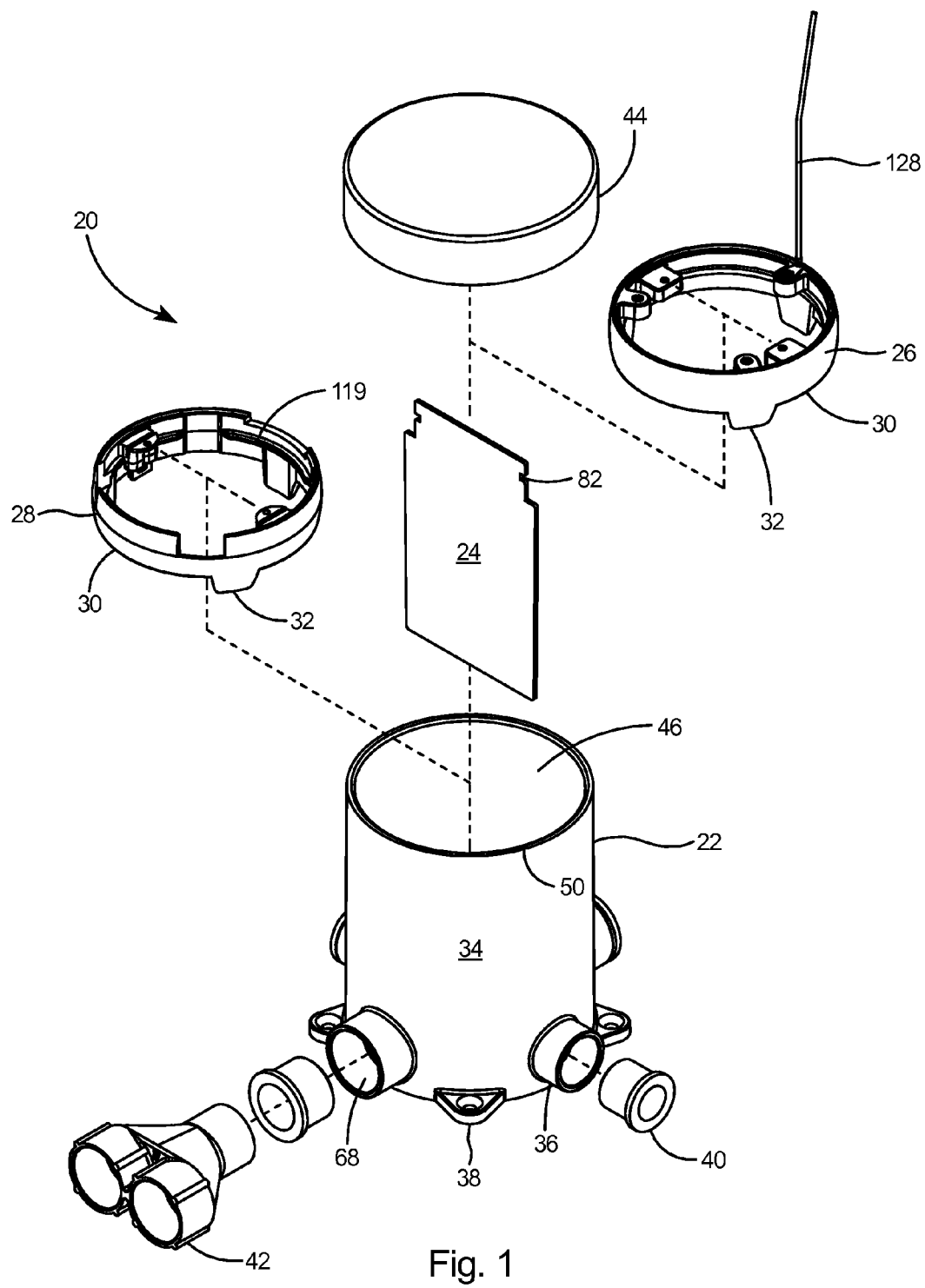
FIG. 1 is an exploded isometric view of an electrical box assembly for poured concrete floors, in accordance with embodiments of the invention.

With reference to FIG. 1, there is shown an electrical box assembly 20 for concrete pours according to the present invention. The electrical box assembly 20 includes an electrical box 22 and an optional slide member 24 for dividing the electrical box into low voltage and high voltage compartments. The electrical box assembly can be configured to mount a conventional electrical cover (not shown), including either a flat electrical cover or a conventional pop-up style electrical cover, to the electrical box 22. The electrical box assembly 20 further depicts a leveling ring 26 for a flat cover and a leveling ring 28 for a pop-up cover, either of which can be selected to mount the desired style of electrical cover. Each leveling ring 26 and 28 includes a lower surface 30 and at least one leg 32 extending downward from the lower surface 30. The electrical box 22 includes a sidewall 34 having one or more hubs 36 and a plurality of feet 38 extending from the sidewall 34. One or more reducers 40 can be used to selectively block off one or more hubs 36 and a Y-connector 42 can be used to configure the electrical box 22 to receive two electrical conduits (not shown) through a single hub 36. In order to keep the interior of the electrical box 22 clean, a pour cap 44 is provided to block the electrical enclosure 46 during the pouring of concrete.

With reference to FIGS. 2-3a, the electrical box 22 includes a bottom wall 48, which combined with the sidewall 34 defines the electrical enclosure 46. The sidewall 34 includes a top 50, a bottom 52, and an inner wall 54. A channel 56 extends along the bottom wall 48 of the electrical box 22 and into the electrical enclosure 46. The channel 56 is formed by two parallel rails 58 that extend along the bottom wall 48 and two side rails 60 that are integral with and extend upward along the inner wall 54. If so desired by the installer, the slide member 24 can be inserted within the enclosure 46 of the electrical box 22 in order to subdivide the enclosure 46 into a high voltage compartment 62 and a low voltage compartment 64 (see FIG. 26). Each of the feet 38 includes an aperture 66 therein and each of the hubs 36 includes a conduit seat 68 therein.

Figures 4, 5:
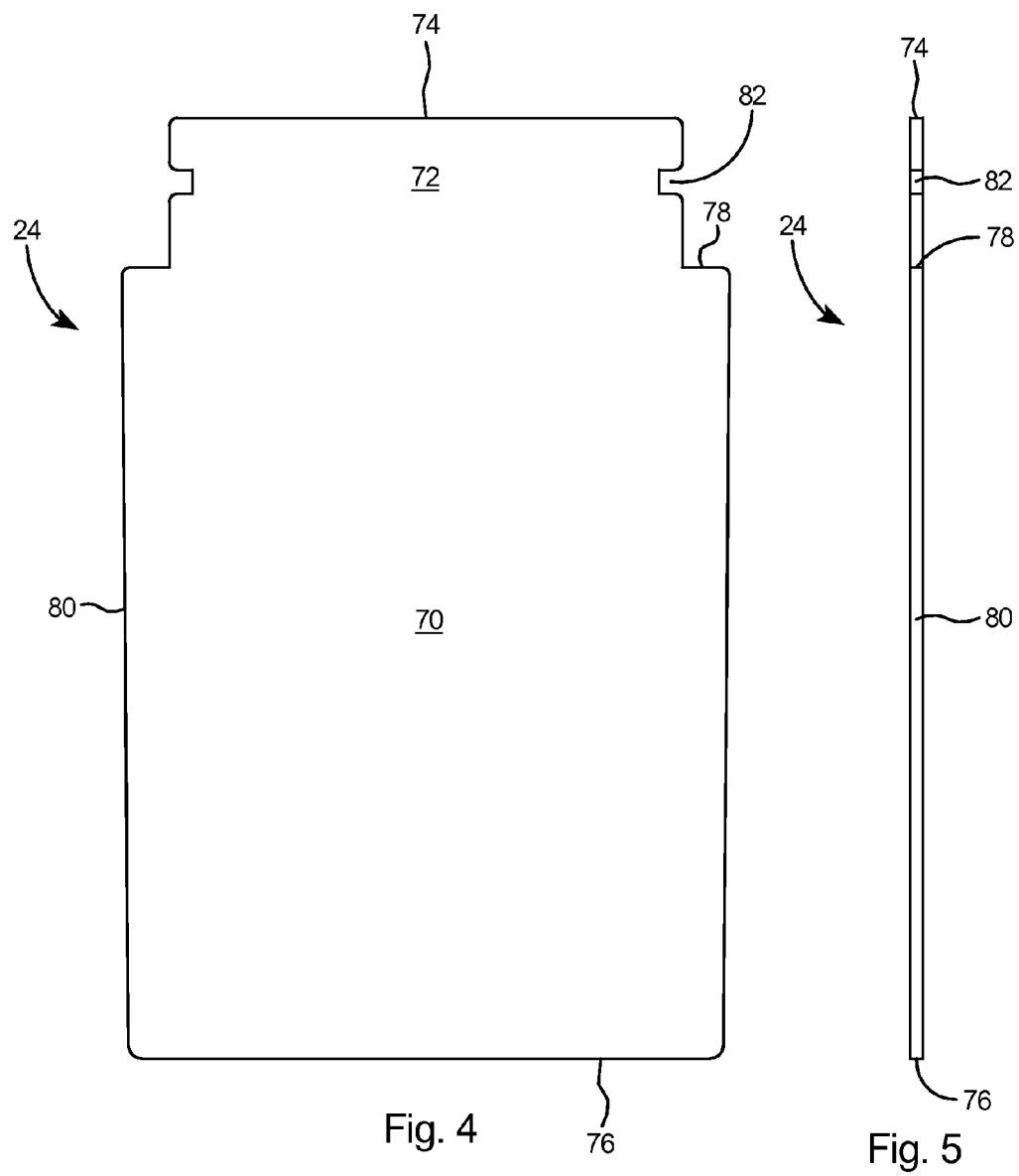
FIG. 4 is a front elevation view of a slide that forms a portion of the electrical box assembly of FIG. 1.
FIG. 5 is a side view of the slide.
Figure 26:
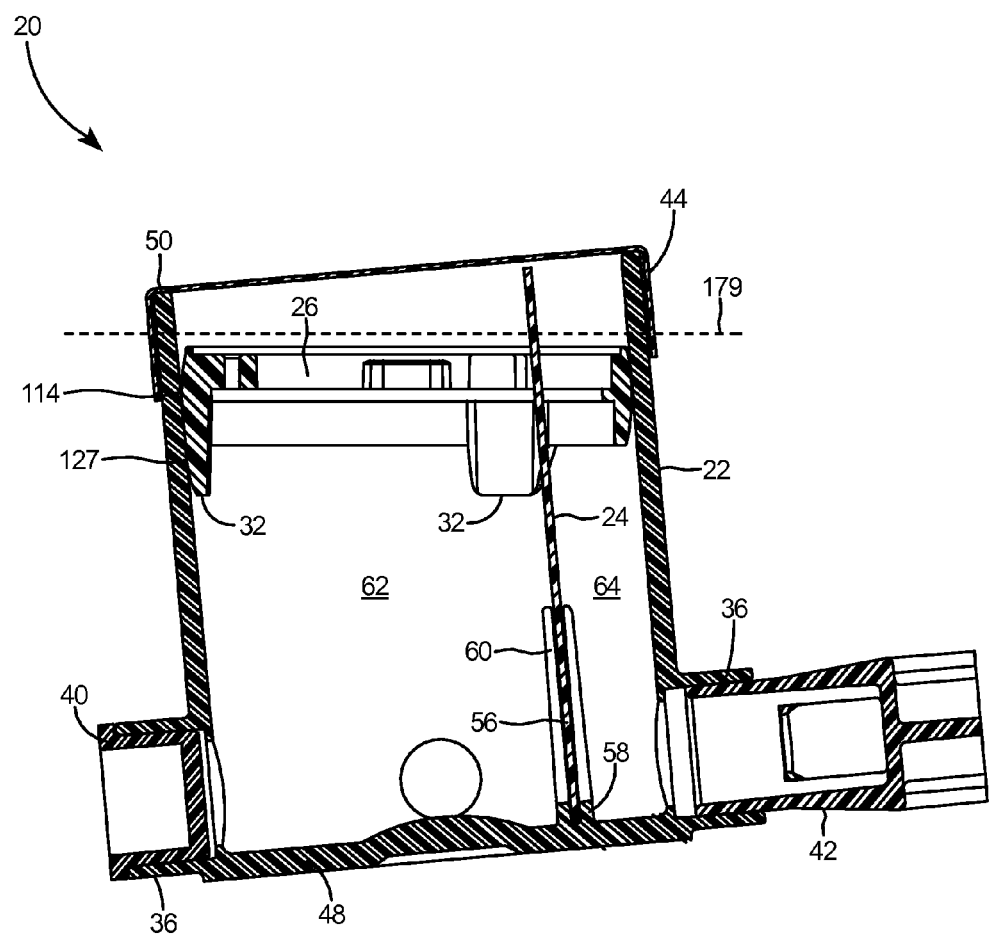
FIG. 26 is a conceptual view of an electrical box assembly including the first embodiment of a leveling ring, with the electrical box installed in concrete and the leveling ring adjusted to be level with the slope of the concrete surface.

As shown in FIGS. 4 and 5, the slide member 24 includes a body 70, a narrowed head portion 72, a top edge 74, a bottom edge 76, a shoulder 78, side edges 80, and notches 82 on opposing sides of the body 70. As shown in FIG. 26, when inserted in the channel 56, the slide member 24 extends substantially to the top 50 of the electrical box 22.

Referring to FIGS. 6-8, the reducer 40 includes a substantially tubular reducer body 84 including an open end 86 with a flange 88 thereon and a nose portion 90 extending from the flange 88 to a closed end 92. A reducer 40 can be inserted into the conduit seat 68 of a hub 36 in order to selectively close one or more hubs 36 on the electrical box 22, as shown in FIG. 1.

With reference to FIGS. 9-12, the Y-connector 42 includes a substantially tubular body 94 including an inlet end 96 with two inlet openings 98 and an outlet end 101 with one outlet opening 103 defining a substantially Y-shaped inner passageway 105 therein. The inlet end 96 includes two conduit seats 107 therein, and the outlet end 101 includes a nose portion 109 adapted to fit snugly within one of the hubs 36 of the electrical box assembly (see FIG. 1). The Y-connector 42 is used to adapt the hub 36 to accept two electrical conduits (not shown).

Figure 13:
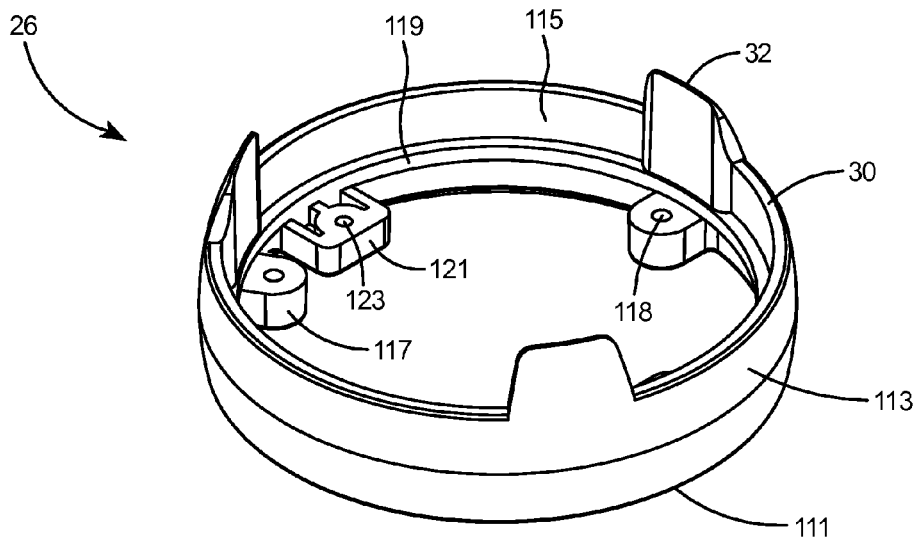
FIG. 13 is a bottom perspective view of a first embodiment of a leveling ring or leveling ring for a flat cover that forms a portion of the electrical box assembly of FIG. 1.
Figure 14:
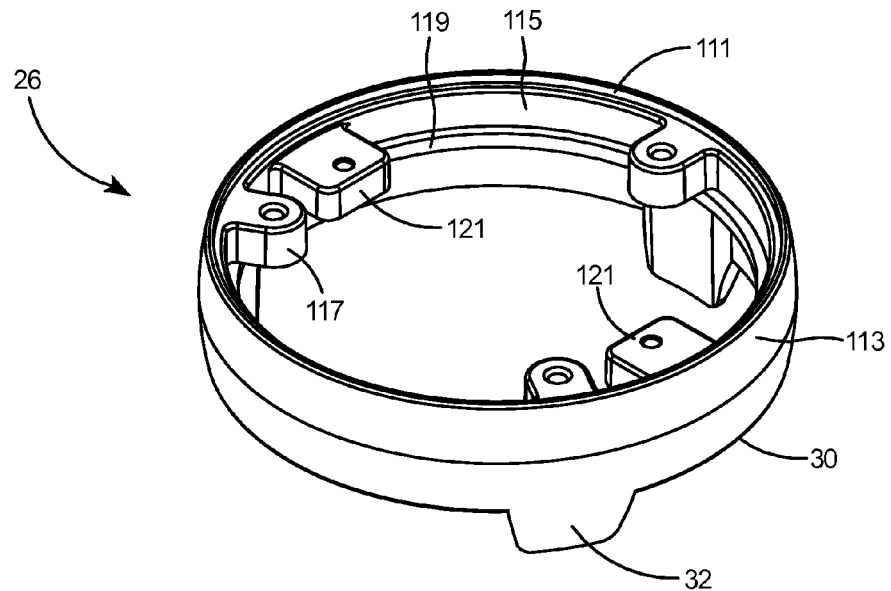
FIG. 14 is a top perspective view of the leveling ring for a flat cover.

With reference to FIGS. 13 and 14, there is shown a first embodiment of a leveling ring 26 according to the present invention. Leveling ring 26 includes a lower surface 30 and at least one leg 32 extending downward from the lower surface 30 and is used to mount a flat electrical cover (not shown) to the electrical box 22 (see FIG. 1). Leveling ring 26 further includes an upper surface 111, an outer periphery 113 including an arcuate outer surface 114, an inner periphery 115, and one or more cover attachment arms 117 having a bore 118 therein extending inward from the inner periphery 115 of the ring. Leveling ring 26 includes a collar 119 on the inner periphery 115 of the ring and the collar 119 extends around the entirety of the inner periphery 115. The leveling ring 26 further includes one or more component attachment arms 121 extending inward from the inner periphery 115 of the ring, each of the component attachment arms 121 including a bore 123 therein.

Referring to FIGS. 15-16a, the cover attachment arms 117 further include a brass insert 125 pressed within each of the bores 118 therein in the arms. At least one of the brass inserts 125 in the cover attachment arms 117 includes a ground wire 128 (see FIG. 1) secured thereto. As shown in FIG. 16, the leg 32 of the leveling ring 26 includes an arcuate outer surface 127 that is coextensive with the arcuate outer surface 114 of the leveling ring 26. A brass insert 129 is pressed within the bore 123 in the each of the component attachment arms 121.

With reference to FIGS. 17-18, there is shown a second embodiment of a leveling ring 28 according to the present invention. In the same manner as the first embodiment of the leveling ring described hereinabove, leg 32 of leveling ring 28 includes an arcuate outer surface 127 that is coextensive with the arcuate outer surface 114 of the leveling ring 28. However, the cover attachment arms 117 of leveling ring 28 each include a slot 131 therein (see FIG. 17) and a metal clip member 133 pressed within each of the slots 131 (see FIG. 18). As shown in FIG. 19, the metal clip member 133 includes a planar base 135 with an opening 137 therein and a lip 139 extending orthogonally from the base 135. The opening in 137 the planar base 135 of the clip member 133 includes a flat edge 141. Lip 139 includes an aperture 143 therein.

Figure 20:
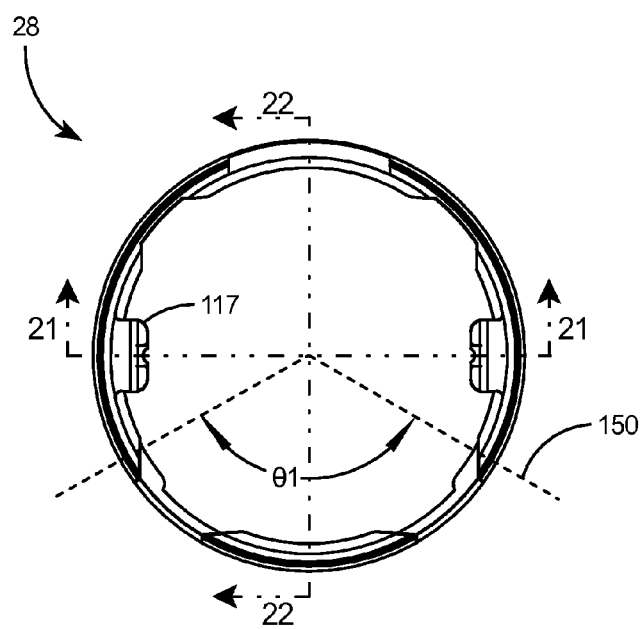
FIG. 20 is a plan view of the leveling ring for a pop-up cover.
Figure 21:
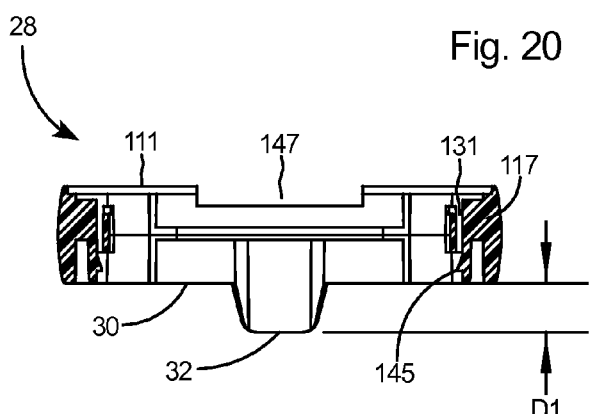
FIG. 21 is a sectional view of the leveling ring for a pop-up cover taken along line 21-21 of FIG. 15.
Figure 22:
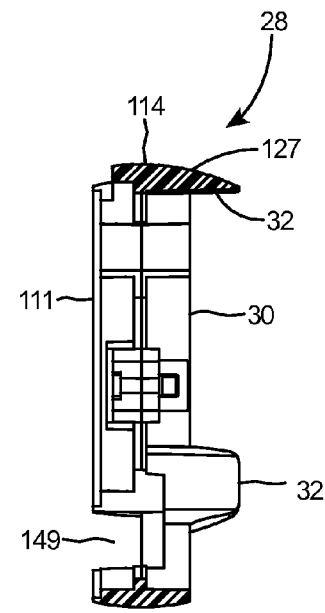
FIG. 22 is a sectional view of the leveling ring for a pop-up cover taken along line 22-22 of FIG. 15.

Referring to FIGS. 20-21, the cover attachment arms 117 include a tab 145 in axial alignment with the slot 131, whereby pressing of the clip member 133 into the slot enables the tab 145 to snap into and engage the opening 137 in the clip member 133 thereby locking the clip member to the leveling ring 28. As shown in FIG. 18, the upper surface 111 of the leveling ring 28 includes a notch 147 therein for accommodating the lock portion of a pop-up electrical cover (not shown) and the upper surface 111 of the leveling ring includes two notches 149 therein for accommodating the hinge portion of a pop-up electrical cover (not shown). As shown in FIG. 21, the leg 32 preferably extends at least 0.5 inch from the lower surface 30 of the leveling ring 28. Most preferably, as shown in FIG. 20, the leveling rings 26 and 28 of the present invention include three of the legs 32 and the legs are preferably arranged 120° apart, as denoted by angle θ1 on FIG. 20, around the periphery of the ring. Dashed line 150 in FIG. 20 indicates position of two of the legs 32 on the ring, which are out of view on the lower surface of the leveling ring 28.

Figure 23:
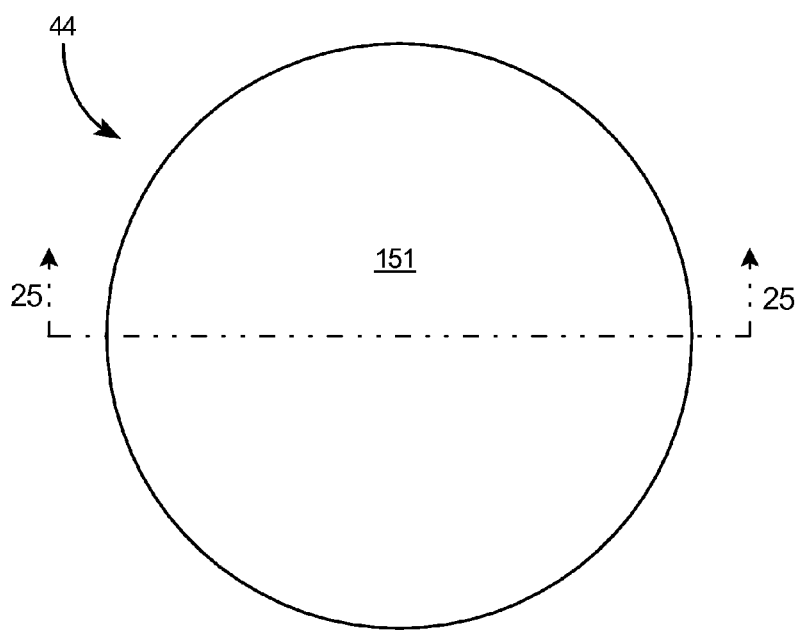
FIG. 23 is a top view of a pour cap that forms a portion of the electrical box assembly of FIG. 1.
Figure 24:
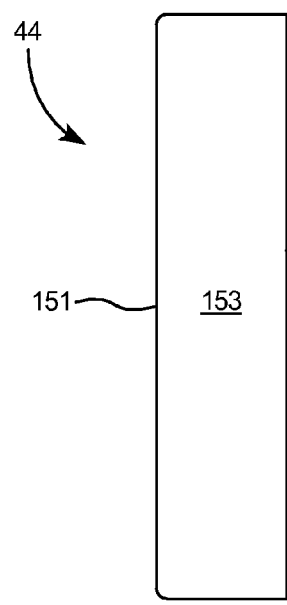
FIG. 24 is a side view of the pour cap.
Figure 25:
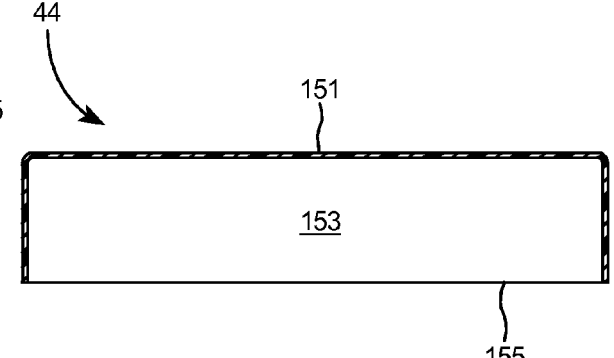
FIG. 25 is a sectional view of the pour cap taken along line 25-25 of FIG. 23.

As shown in FIGS. 23-25, the electrical box assembly 20 includes a pour cap 44 that is adapted for sliding over and covering the top 50 of the electrical box 22 (see FIG. 1). The pour cap 44 includes a top 151 and a sidewall 153 including a lower edge 155.

With reference to FIGS. 28-30a, the electrical box assembly may further include a leveling ring adapter 157. The leveling ring adapter 157 includes a ring portion 159 including an outer periphery 161, an inner periphery 163, and an upper surface 165. A lip 167 extends inward from the inner periphery 163 of the ring portion 159 and a notch 169 is provided in the lip 167 for accommodating passage of the leg 32 of the leveling ring 26 or 28, when adapter 157 is used to adapt the leveling ring to a larger diameter electrical box (not shown). The leveling ring adapter 157 includes a plurality of narrow tabs 171 extending upward from the upper surface 165 of the ring portion 159 and a plurality of wide tabs 173 extending upward from a juncture 175 with the upper surface 165 of the ring portion 159. A notch 177 is provided at the juncture 175 of the wide tabs 173 with the upper surface 165 of the ring, the notch 177 enabling removal of the wide tabs 173 in order to reduce the outer diameter of the leveling ring adapter. By retaining the wide tabs 173 on the adapter ring 157, the adapter ring will enable a leveling ring to accommodate an electrical box enclosure with diameter D2 as shown in FIG. 29. By removing the wide tabs 173 on the adapter ring 157, the adapter ring will enable a leveling ring to accommodate an electrical box enclosure with diameter D3 as shown in FIG. 29.

For an understanding of the operation of the present invention, the reader is referred to FIG. 1. The electrical box assembly 20 enables an installer to mount an electrical box 22 within a formed area that will be filled with concrete. Electrical box 22 is placed within the formed area and may be anchored to the floor if desired by driving fasteners (not shown) through apertures 66 in feet 38. Concrete is then poured into the formed area. After the concrete is cured, the top of electrical box sidewall 34 may be trimmed off with a saw to adjust the top of the electrical box to be substantially level with the concrete. If the electrical box 22 is subdivided into low and high voltage compartments, a portion of the bottom edge 76 of slide member 24 may be cut away to adjust the slide to fit the shortened electrical box 22. The installer may then upon his preference install either leveling ring 26 to accommodate a flat electrical cover or leveling ring 28 to accommodate a pop-up electrical cover. The leveling rings 26 and 28 enable the electrical cover to be leveled with respect to the level of the cured concrete. When either leveling ring 26 or 28 is inserted in electrical box 22, notches 82 on slide member 24 is adapted to engage the collar 119 on the leveling ring, thereby holding the leveling ring within the box.

FIG. 26 depicts a situation in which the electrical box 22 has been knocked out of a plumb alignment and thus the electrical box is tilted sideways with respect to the concrete surface 179 and thus one side of the electrical box is higher than the opposing side. In this situation, the installer would remove the pour cap 44, the leveling ring 26 and the slide member 24, and cut the electrical box 22 at the desired level, substantially near the concrete surface 179. Bottom edge 76 of slide 24 is then trimmed to the proper size to not extend beyond the top 50 of the electrical box and is slid into channel 56 to subdivide the box into a high voltage compartment 62 and a low voltage compartment 64. It should be noted that either compartment can be designated for low or high voltage as desired. The installer then applies adhesive to the outer arcuate surface 114 of the leveling ring 26 and to the arcuate outer surface 127 of each leg 32. The leveling ring 26 is placed into the electrical box 22 at the desired level after which the adhesive cures and bonds the leveling ring to the sidewall 34 of the electrical box.

Figure 27:
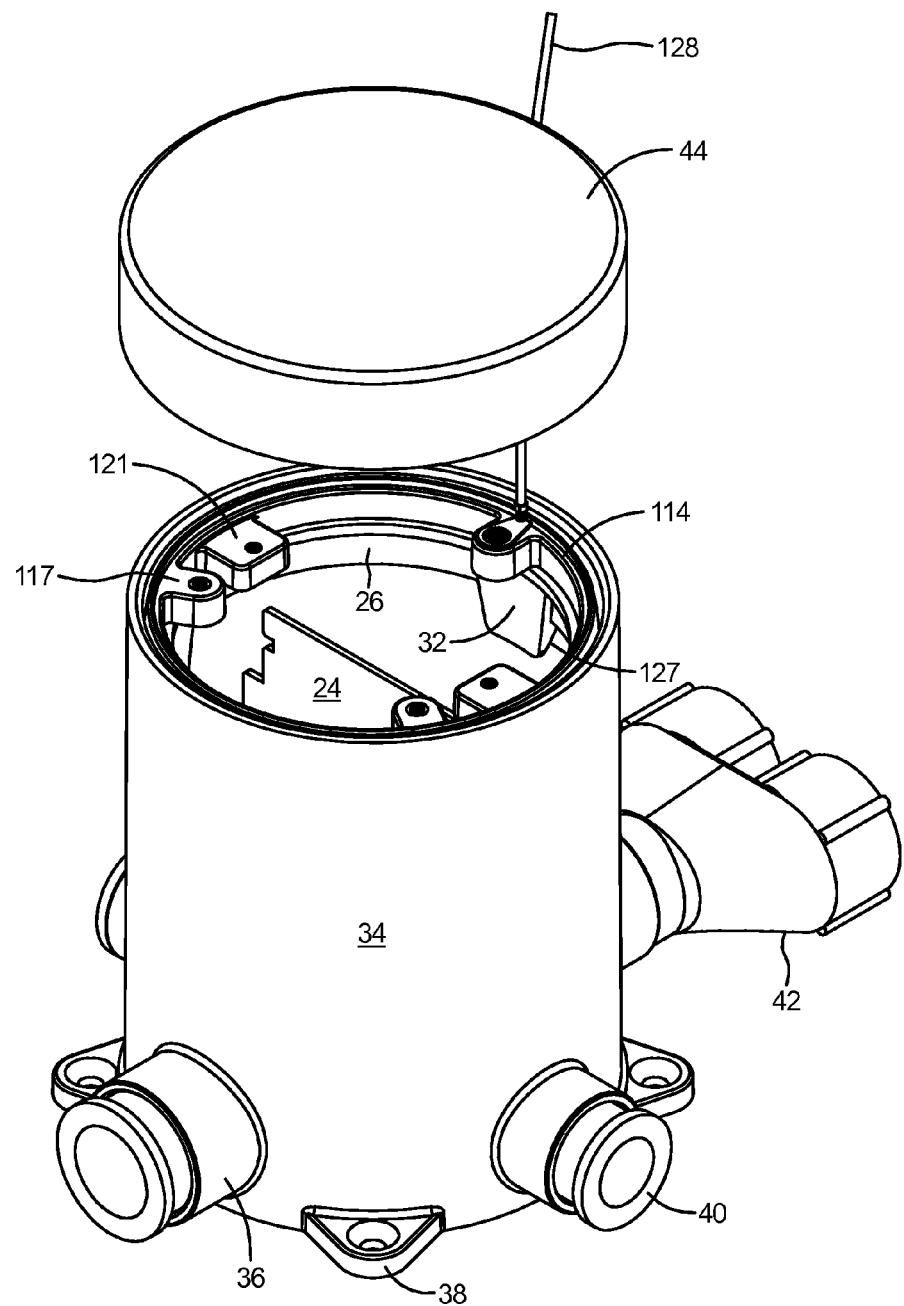
FIG. 27 is a perspective view of an electrical box assembly including the first embodiment of a leveling ring installed therein and with a pour cap exploded away.

With reference to FIG. 27, the arcuate outer surface 114 of the leveling ring 26 is adapted for fitting snugly within the electrical enclosure 46, even when the ring is tilted to level the electrical box cover with respect to the concrete surface. Arcuate outer surface 127 of the leg 32 will also fit snugly within the electrical enclosure and the added surface area for gluing provided by the arcuate outer surface of the leveling ring adds significantly to the strength of the bond between the leveling ring and the electrical box.

With reference to FIG. 1, the material of construction of the electrical box 22, slide member 24, leveling rings 26 and 28, reducer 40, Y-connector 42, and pour cap 44 is plastic. Most preferably, each of these elements are molded in one piece of plastic, with the brass inserts 129 pressed into apertures 123 in the arms 121 of leveling ring 26 (see FIG. 15) and the clip member 133 of leveling ring 28 (see FIG. 19) preferably constructed of steel. Most preferably, the electrical box 22, slide member 24, leveling rings 26 and 28, reducer 40, and Y-connector 42 are constructed of polyvinyl chloride (PVC). The pour cap 44 is most preferably constructed of polypropylene.

Having thus described the invention with reference to a preferred embodiment, it is to be understood that the invention is not so limited by the description herein but is defined as follows by the appended claims. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments herein were chosen and described in order to best explain the principles of the invention and the practical application, and to enable others of ordinary skill in the art to understand the invention.

What is claimed is:

1. An electrical box assembly for installing an electrical component within a surface, said electrical box assembly comprising:

an electrical box including a bottom wall and a peripheral wall defining an electrical enclosure with an inner wall therein, said peripheral wall including a top and a bottom;

a channel extending along said bottom wall of said electrical box into said electrical enclosure;

a leveling ring for leveling the electrical component with respect to the surface, said leveling ring including an upper surface, a lower surface, a vertically arcuate outer surface of the ring to fit snugly within said electrical enclosure, and a leg extending downward from said lower surface, said leg enabling the ring to bond more securely to the electrical box;

said electrical box including a plurality of feet for anchoring said electrical box to a surface and one or more hubs for receiving electrical conduit therein, said hubs extending from said bottom of said peripheral wall;

a slide member for dividing said electrical enclosure vertically into a high voltage compartment and a low voltage compartment, said slide member having a bottom edge, said slide member adapted to slide within said electrical enclosure and engage said channel; and two parallel rails extending from said bottom wall into said electrical enclosure and forming said channel.

2. The electrical box assembly of claim 1, wherein said leveling ring includes
an outer periphery and an inner periphery; and
one or more cover attachment arms extending inward from said inner periphery.

3. The electrical box assembly of claim 2, wherein
each of said cover attachment arms include a bore therein; and
a brass insert pressed within each of said bores in said cover attachment arms.

4. The electrical box assembly of claim 3, wherein at least one of said brass inserts in each of said cover attachment arms includes a ground wire secured thereto.

5. The electrical box assembly of claim 2, including
a collar extending from said inner periphery of said leveling ring; and
said collar extending around the entirety of said inner periphery.

6. The electrical box assembly of claim 2, wherein said leveling ring includes
one or more component attachment arms extending inward from said inner periphery;
each of said component attachment arms including a bore therein; and
a brass insert pressed within each of said bores in said component attachment arms.

7. The electrical box assembly of claim 2, wherein
each of said cover attachment arms includes a slot therein; and
a metal clip member pressed within each of said slots in said cover attachment arms.

8. The electrical box assembly of claim 7 wherein said metal clip member includes
a planar base with an opening therein; and
a lip extending orthogonally from said planar base.

9. The electrical box assembly of claim 8 wherein
said opening in said planar base of said clip member includes a flat edge; and
each of said cover attachment arms include a tab in axial alignment with one of said slots, whereby pressing of said clip member into said slot enables said tab to engage said opening in said clip member thereby locking said clip member to said leveling ring.

10. The electrical box assembly of claim 1, including a pour cap adapted for sliding over and covering said top of said peripheral wall.

11. The electrical box assembly of claim 10, wherein said pour cap includes
a top; and
a sidewall of said pourcap, said sidewall of said pourcap including a lower edge.

12. The electrical box assembly of claim 1, wherein
said leg of said leveling ring includes an arcuate outer surface; and
said arcuate outer surface of said leg is coextensive with said arcuate outer surface of said leveling ring.

13. The electrical box assembly of claim 1 wherein said slide member includes
a body;
a shoulder on said body;
notches on opposing sides of said body; and
a top edge.

14. The electrical box assembly of claim 1 including a pop-up electrical cover with a lock portion and a hinge portion, wherein
said upper surface of said leveling ring includes a notch therein for accommodating said lock portion of said pop-up electrical cover; and
said upper surface of said leveling ring includes two notches therein for accommodating said hinge portion of a pop-up electrical cover.

15. The electrical box assembly of claim 1, wherein said leg extends at least 0.5 inch from said lower surface of said leveling ring.

16. The electrical box assembly of claim 1, wherein
said leveling ring includes three of said legs; and
said legs are arranged 120 degrees apart on said leveling ring.

17. The electrical box assembly of claim 1, including a leveling ring adapter, said leveling ring adapter including
a ring portion including an outer periphery, an inner periphery, and an upper surface;
a lip extending inward from said inner periphery of said ring portion; and
a notch in said lip of said ring portion for accommodating passage of said leg of said leveling ring.

18. The electrical box assembly of claim 17, wherein said leveling ring adapter includes
a plurality of narrow tabs extending upward from said upper surface of said ring portion;
a plurality of wide tabs extending upward from a juncture with said upper surface of said ring portion; and
a notch on said ring portion at said juncture of said wide tabs with said ring portion, said notch enabling removal of said wide tabs in order to reduce the outer diameter of said leveling ring adapter.

19. The electrical box assembly of claim 1, including a reducer for closing off one or more of said hubs, said reducer including
a substantially tubular reducer body including an open end with a flange thereon; and
a nose portion extending from said flange to a closed end.

20. The electrical box assembly of claim 1, including a Y-connector for adapting said hub to accept two electrical conduits, said Y-connector including
a substantially tubular body including an inlet end with two inlet openings and an outlet end with one outlet opening defining a substantially Y-shaped inner passageway therein;
said inlet end of said Y-connector including two conduit seats therein; and
said outlet end of said Y-connector including a nose portion adapted to fit snugly within one of said hubs.

* * * * *